US009926095B2

(12) United States Patent
Sigler, Jr.

(10) Patent No.: US 9,926,095 B2
(45) Date of Patent: Mar. 27, 2018

(54) RECONFIGURED AND UPGRADED COMPONENT PARTS FOR A PACKAGING LABELER MACHINE

(71) Applicant: Richard W. Sigler, Jr., Alexandria, IN (US)

(72) Inventor: Richard W. Sigler, Jr., Alexandria, IN (US)

( * ) Notice: Subject to any disclaimer, the term of this patent is extended or adjusted under 35 U.S.C. 154(b) by 0 days.

(21) Appl. No.: 15/075,130

(22) Filed: Mar. 19, 2016

(65) Prior Publication Data

US 2016/0272426 A1 Sep. 22, 2016

Related U.S. Application Data

(60) Provisional application No. 62/136,497, filed on Mar. 21, 2015.

(51) Int. Cl.

| | |
|---|---|
| ***B65G 21/20*** | (2006.01) |
| ***B65C 9/02*** | (2006.01) |
| ***B65C 3/10*** | (2006.01) |
| ***B65C 9/00*** | (2006.01) |

(52) U.S. Cl.

CPC .................. *B65C 9/02* (2013.01); *B65C 3/10* (2013.01); *B65C 9/00* (2013.01)

(58) Field of Classification Search

CPC ............................ B65G 21/20; B65G 21/2072

USPC ....................................................... 198/836.3

See application file for complete search history.

(56) References Cited

U.S. PATENT DOCUMENTS

| | | | | |
|---|---|---|---|---|
| 497,368 | A | 5/1893 | Crittenden | |
| 833,896 | A | 10/1906 | Rexroth et al. | |
| 2,224,496 | A | 12/1940 | Wild et al. | |
| 2,626,075 | A | 1/1953 | Hesson | |
| 2,804,303 | A | 8/1957 | Henthorn | |
| 3,097,983 | A | 7/1963 | Caulford et al. | |
| 3,179,548 | A | 4/1965 | Debray | |
| 3,648,823 | A | 3/1972 | Neer | |
| 3,787,267 | A | 1/1974 | Neer | |
| 4,216,855 | A * | 8/1980 | Raudat | B65B 21/04 198/836.3 |
| 4,670,087 | A | 6/1987 | Brown et al. | |
| 5,782,339 | A * | 7/1998 | Drewitz | B65G 21/2072 198/836.3 |
| 6,135,271 | A * | 10/2000 | Ledingham | B65G 21/2072 198/836.3 |
| 8,015,675 | B2 * | 9/2011 | Andreoli | B65G 21/2072 198/836.3 |

(Continued)

*Primary Examiner* — James R Bidwell

(74) *Attorney, Agent, or Firm* — Ritchison Law Offices, PC; John D Ritchison

(57) ABSTRACT

An upgraded and reconfigured components in a labelling machine used for labelling containers and cans automatically and in continuous sequence. In this type of machine the containers or other articles roll through the machine over a substantially horizontal track where the containers receive a label with an adhesive applied to the cylindrical side of the container. Next the label is wrapped about the container and secured to the side of the container by a suitable adhesive. These machine upgrades and reconfigurations relate to machines for applying labels to articles of cylindrical form and are designed primarily for placing labels on cans as they are conveyed through the machine over runways.

5 Claims, 14 Drawing Sheets

(56) References Cited

U.S. PATENT DOCUMENTS

| | | | | |
|---|---|---|---|---|
| 2010/0206699 | A1* | 8/2010 | Petrovic ............ | B65G 21/2072<br>198/836.3 |
| 2012/0090964 | A1* | 4/2012 | Andreoli ........... | B65G 21/2072<br>198/836.3 |

* cited by examiner

All OEM
Improvements

Thru Holes
L
C
T
W
30
46
48
50
60
61
62
80A
85A
93
94
94A
96
40A

Typical Container Machine
Prior Art

Labeler Portion of Machine
Sections Figs 6 B and 6 C

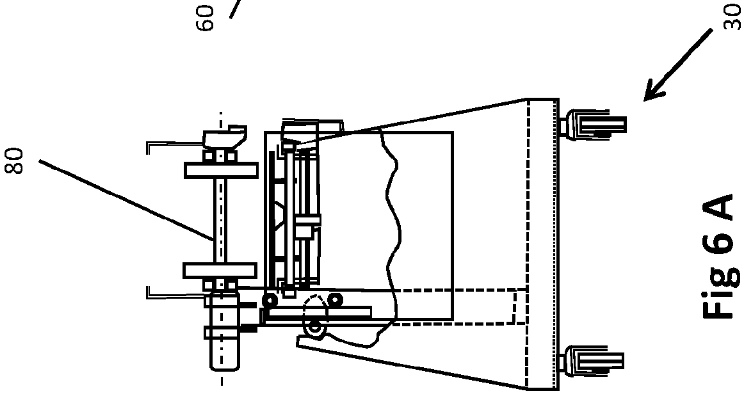
Fig 6 A
INFEED
Fig. 3
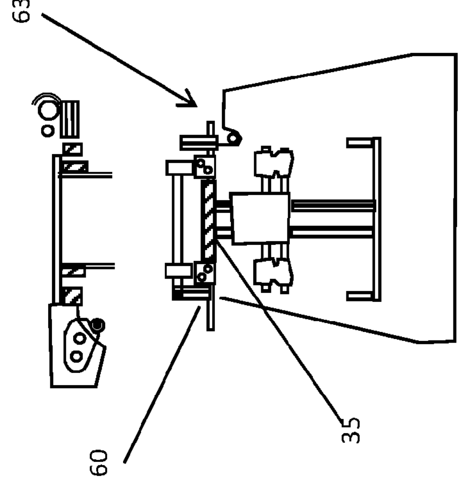
Fig 6 B
CROSS SECTION
Fig. 3 B-B
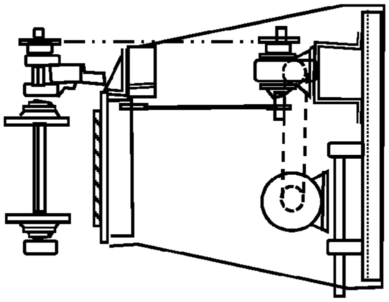
Fig 6 C
CROSS SECTION
Fig. 3 C-C
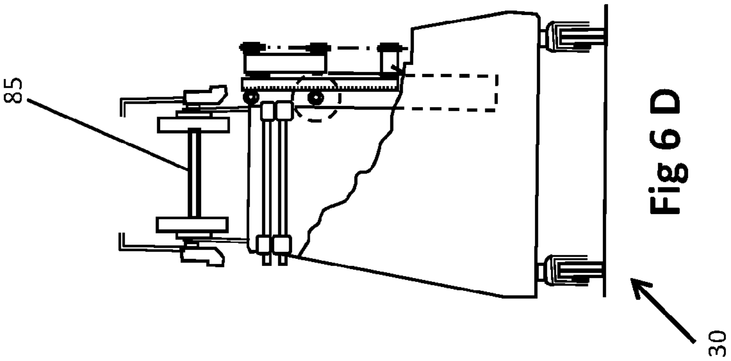
Fig 6 D
DISCHARGE
Fig. 3

Typical Machine

Pulley and Shafts and Container Guides

Prior Art

Improved Components
On Typical Machine 40
40A
41
42
42A
44
45
46
47
48
48A
48B
48C
80A, 85A
82

Improved Infeed
Pulley Shaft 80A

Improved Discharge
Pulley Shaft 85A

SHORT STRAIGHT CONTINUOUS SPRING RAIL

Typical Machine Container Guides See Fig. 7

Prior Art

Improved Long, Straight
Continuous
Spring Rail

Improved Angled
Continuous
Spring Rail

RECONFIGURED AND UPGRADED COMPONENT PARTS FOR A PACKAGING LABELER MACHINE

CROSS-REFERENCE TO RELATED APPLICATIONS

This application claims the benefit of United States Provisional Patent Application Ser. No. 62/136,497 filed Mar. 21, 2015 by Richard W. Sigler, Jr. and entitled "Improved Packaging Labeler Component Parts".

FIELD OF INVENTION

This invention relates to a Reconfigured and Upgraded Component Parts for a Packaging Labeler Machine. Particularly this invention pertains to a can labelling machine. This invention relates to upgrades and reconfigurations in the labelling machine/apparatus for labelling cans or containers automatically and in continuous sequence. In this type of labeling machine the containers or other articles roll through the machine over a substantially horizontal track or bed where they pick up a label by means of an adhesive applied to the cylindrical side of the container after which the label is wrapped about the container and secured to the side of the container and at the opposite end of the label by a suitable adhesive. This invention relates to machines for applying labels to articles of cylindrical form and is designed primarily for placing labels on cans as they are conveyed through the machine over runways.

The Reconfigured and Upgraded Component Parts for a Packaging Labeler Machine anticipates both original equipment manufactured (OEM) and aftermarket installation for the device into various labelling machines as discussed below.

FEDERALLY SPONSORED RESEARCH

None.

SEQUENCE LISTING OR PROGRAM

None.

BACKGROUND—FIELD OF INVENTION and PRIOR ART

A diligent patent search for other or similar devices was conducted. However, as far as known, there are no Improved Packaging Labeler Component Parts or the like. It is believed that this product and process are unique in their design and technologies.

Prior art related in this field is summarized as follows:

A. A U.S. Pat. No. 2,626,075 was issued in 1953 to Hesson and was entitled "can labeling machine". It is a can labelling machine wherein a new supply of labels may be added to the pack of labels being depleted without shutting down the operation of the machine.

B. A U.S. Pat. No. 2,804,303 was issued in 1957 to Henthorn and was entitled "continuous label feed mechanism". In this type of labeling machine the containers or other articles roll through the machine over a substantially horizontal rack or bed where they pick up a label by means of an adhesive applied to the cylindrical side of the container after which. the label is wrapped. about the container and secured to the side of the container or at the opposite end of the label by a suitable adhesive.

C. A U.S. Pat. No. 3,097,983 was issued in 1963 to Caulford et al. and was entitled "automatic labelling apparatus". It provides an improved automatic labelling apparatus which can handle in continuous sequence greater number of containers than those heretofore and in which greater control of the disposition of the labels on the applied labels and the appearance of the labelled containers generally.

D. A U.S. Pat. No. 3,179,548 was issued in 1965 to Debray and was entitled "can labelling machine". This pertains to a can labelling machine and more particularly to a mechanism used in such a machine for elevating the labels in position for application on a can.

E. A U.S. Pat. No. 3,787,267 was issued in 1974 to Neer and was entitled "labelling machine". It is a labeling machine having primary and secondary label feed assemblies provided in the present labeler with a common source of intermittent power for feeding labels that can be selected to actuate either assembly from a reciprocating power driven member through over-running clutches to give a positive label feeding movement without and to prevent backlash to the label pack supporting and feeding elements. The assemblies may operate independently of each other or/and in an interdependent manner to maintain the top or operating label pickup level of the label pack at a substantially constant operating level. With the present label feed mechanism the operating of the labeler may be continuous without the necessity to stop the labeling operation when introducing a fresh pack of labels to the machine. The primary label pack feeding mechanism stops automatically upon the exhaustion of the labels of the pack. The secondary label pack feeding mechanism also stops automatically upon reaching a predetermined feeding height rather than to a point of complete exhaustion of its respective labels or label pack to prevent breakdown clashing between the primary and secondary feeding mechanisms.

F. A U.S. Pat. No. 4,670,087 was issued in 1987 to Brown et al. and was entitled "labeling machine". It demonstrates an apparatus for applying labels to cans of a straight or substantially frusto-conical design is disclosed. The apparatus uses an elongated track for supporting one edge of the can and a single belt extending longitudinally above the track and adapted to selectively engage an edge of the can to rotate and advance the can along the track. Movement of the can relative to the track is restrained by retaining the can against a pair of spaced, longitudinally extending non-magnetic guide surfaces. The can is retained against the guide surfaces through magnetic attraction of the can by a series of magnets positioned intermediate of but offset from the guide surfaces. As the can moves along the track, a suitable label is affixed to the surface of the can.

G. A U.S. Pat. No. 3,648,823 was issued in 1972 to Neer and was entitled "labeling machine". Shown is a labeling machine having a single narrow endless can feed belt that engages the median areas of the sidewalls of the cans mounted on respective pulley assemblies with an articulated drive and supports therefor that are adjustable to different diameter cans and supported from one side of the machine, comprises pairs of rigid vertical rack and stiffening bars positioned at opposite ends of the machine, with adjustable lower and upper sets of pressure rollers for the belt. A can runway with adjustable rigid and flexible can guides. The initial portion, at the feed end of the machine, of the can runway is in the form of a narrow can runway strip for supporting the cans from below at their median sidewall areas. This, together with the narrow feed belt engagement with the upper exposed median areas of the cans enables the cans to travel and be fed over the narrow runway strip with the greater portion of the upper and lower sidewall areas of the cans uncontacted and undisturbed beyond the median contact areas by the belt and runway strip for a desired operation thereon by the labeling machine function.

H. A U.S. Pat. No. 2,224,496 was issued in 1940 to Wild et al. and was entitled "can labeling machine". This invention relates to a machine for labeling cans and other cylindrical packages which are passed through the machine by rolling in a substantially horizontal direction, passing in turn over the adhesive applying mechanism for the label and over the label pack and then over the pressing mechanism. In this operation the adhesive is first applied to the cans or packages, the labels are then picked up in turn by the adhesive on the cans or packages, and rolled about the same, the lap ends of the labels are then secured by adhesive from another source, and the labels are finally pressed into close contact with the cans or packages which are thereafter delivered from the machine.

I. A U.S. Patent 833896 was issued in 1906 to Rexroth et al. and was entitled "can-labeling machine". This invention relates to improvements in machines for wrapping cans, in which the wrapper is pasted to the can and has extended ends which are folded down by the machine upon and against the can ends and the invention also relates to machines for the above purpose which can also be used for affixing and pasting labels to the cans in the ordinary way-that is, for affixing labels which do not exceed in width the length of the can.

J. A U.S. Patent 497368 was issued in 1893 to Crittenden et al. and was entitled "can labeling machine". It provides machines for automatically pasting labels on round or cylindrical objects, such as cans or jars; and more particularly to that species of such machines in which the momentum of the can itself in descending along an inclined run-way, imparts to the various devices which co-operate in the application of the label, the necessary power for their actuation.

None of these changes found prior art examples anticipate or suggest as obvious the Reconfigured and Upgraded Component Parts for a Packaging Labeler Machine provided herein.

SUMMARY OF THE INVENTION

This invention is a set of reconfigured and upgraded component parts for a packaging labeler machine that facilitate quick set-up and changeovers. The labelling machines with these upgrades and reconfigurations anticipate essentially continuous operation with minimal down-time for maintenance and repairs and facilitate quick set-up and changeovers. Taught here are the ways to upgrade and reconfigure material handling and labelling of glass, plastic and can containers with more efficient maintenance and changeover of the labelling machines and other material handling devices.

The preferred embodiment is a set of upgrade and reconfigured components for a container labeling machine made of durable materials and essentially comprising: an adjustment knob block assembly with a lock knob and block components for adjusting the label bed; a locking system for key stock on the infeed and discharge shafts; a wheel and wheel hub positioning set with at least four movable yokes for positioning the wheels on the shafts; and a set of improved guide rails wherein the improvements can provide faster installation and repair as well as longer life with the improved durable materials. The preferred embodiments of the reconfigured and upgraded component parts for a packaging labelling machine are further described as follows:

A. An adjustment knob block assembly with features comprising: a knob block 60 with a threaded knob shaft opening 70; a stepped mounting opening 71; a block of material 72 (durable aluminum or composite); a machine rail slot 73; a lever nut recess 74; a lever nut aperture 75; a clamp slot 76; and relief kerfs 77 for clamping; a lever lock 61 (L & R—handed, one each) with a lever fastening means 78 (threaded bolt and aperture or equal and with both a left and right threads (one each) made from materials such as a hardened steel bolt or equal) and configured with a lever handle 79; and a lever nut—left and right hand (one each)—62 (note the lever, lever handle, nut and threads are preferred 4140 pre hard steel and could also be 304 stainless steel, composite material or equal) wherein the knob block can be coupled with a knob and provide fast adjustment and locking means for a label box 38, and label bed 35.

B. A wheel 46, a wheel hub 40, and wheel guide yoke 50 comprised with features: the wheel 46 with aperture 40A for wheel hub 40 and threaded aperture 42A for fasteners; the wheel hub 40 with yoke slot 41; mounting apertures 42; key way 44 (double); and shaft aperture 45; and the labeler wheel guide yoke 50 comprised of the labeler wheel guide yoke 50 (a plate material 51 LE Linen based phenolic or equal); a mounting aperture 52; a slot 53/ radiused for yoke slot 41; and multiple grease aperture 54 fitting mounts.

C. A series of upgraded and reconfigured container spring rails (94 A, B, C) of different extended lengths and configuration and made of pre-hardened materials chamfered and pinned with OEM pins 95.

The newly invented Reconfigured and Upgraded Component Parts for a Packaging Labeler Machine may be manufactured at low volumes by very simple means and in high volume production by more complex and controlled systems.

OBJECTS AND ADVANTAGES

There are several objects and advantages of the Reconfigured and Upgraded Component Parts for a Packaging Labeler Machine. There are currently no known improvements in the container labelling industry that are effective at providing the objects of this invention.

The Improved Packaging Labeler Component Parts have the following advantages:

| ITEM | Advantage |
|---|---|
| 1 | Quick changeover and adjustments - label adjustment knob and lever lock; wheel yoke socket and adjustment; and spring rails |

-continued

| ITEM | Advantage |
|---|---|
| 2 | Durable materials - OEM components reconfigured and upgraded for longer life, less maintenance |
| 3 | Interchangeable with OEM designs to minimize maintenance and change over time with rework of current machines |
| 4 | Lubrication improved wheel yoke |

Finally, other advantages and additional features of the present Reconfigured and Upgraded Component Parts for a Packaging Labeler Machine will be more apparent from the accompanying drawings and from the full description of the device. For one skilled in the art of labelling machines, it is readily understood that the features shown in the examples with this product are readily adapted to other types of container handling and labelling machines, systems, and devices.

DESCRIPTION OF THE DRAWINGS—FIGURES

The accompanying drawings, which are incorporated in and constitute a part of this specification, illustrate an embodiment of the Reconfigured and Upgraded Component Parts for a Packaging Labeler Machine that is preferred. The drawings together with the summary description given above and a detailed description given below serve to explain the principles of the Reconfigured and Upgraded Component Parts for a Packaging Labeler Machine. It is understood, however, that the Reconfigured and Upgraded Component Parts for a Packaging Labeler Machine is not limited to only the precise arrangements and instrumentalities shown.

FIGS. 1 A through 1 C are sketches of the general OEM labeling machine. FIGS. 1 D through 1 J are upgraded and reconfigured components for the container labelling machine.

Figure 4B:
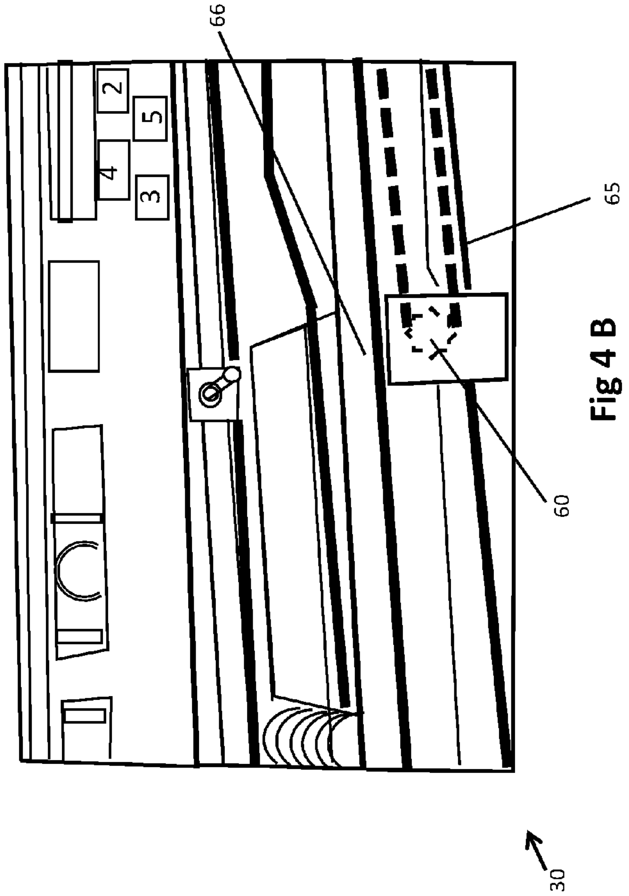
Figure 4A:
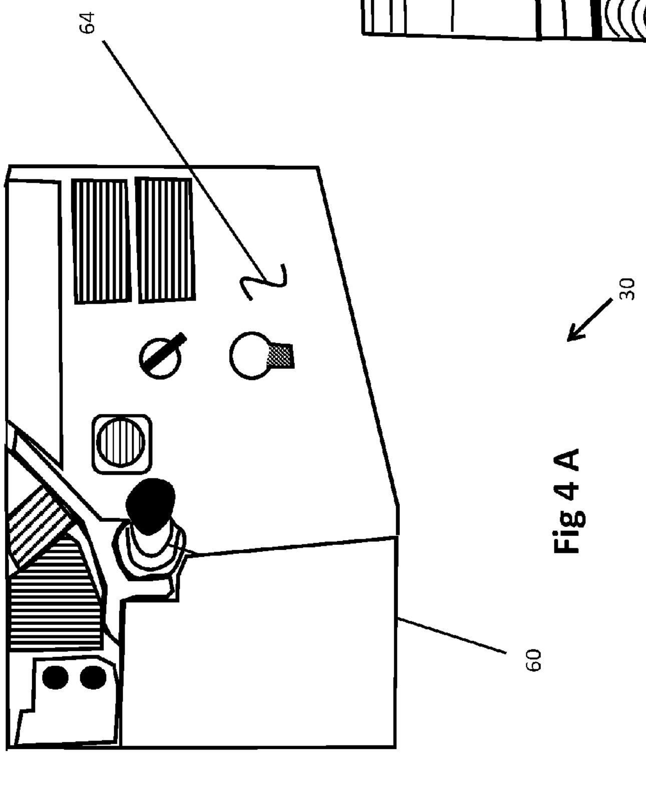

FIGS. 4 A and 4 B are sketches of a general side and top view of label machine where an upgraded and reconfigured adjustment knob/block assembly 60 is installed.

Figures 5A, 5B, 5C, 5D:
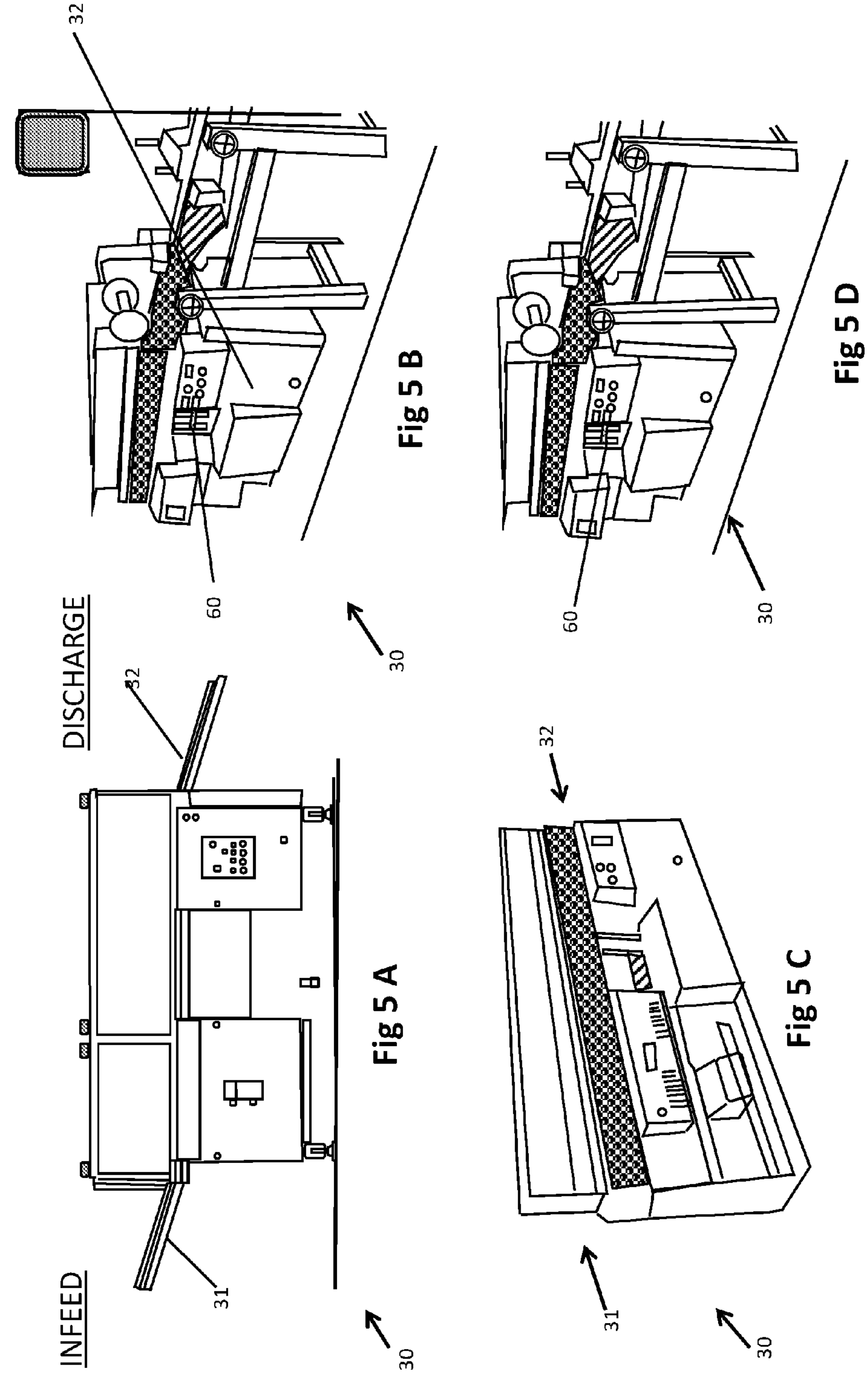

FIGS. 5 A through 5 D are sketches of the OEM labeler machine from various angles to show the machine which benefits from the upgraded and reconfigured components.

FIGS. 6 A through 6 D are cross section sketches of end views and cross sections of the OEM label machine.

Figure 7A:
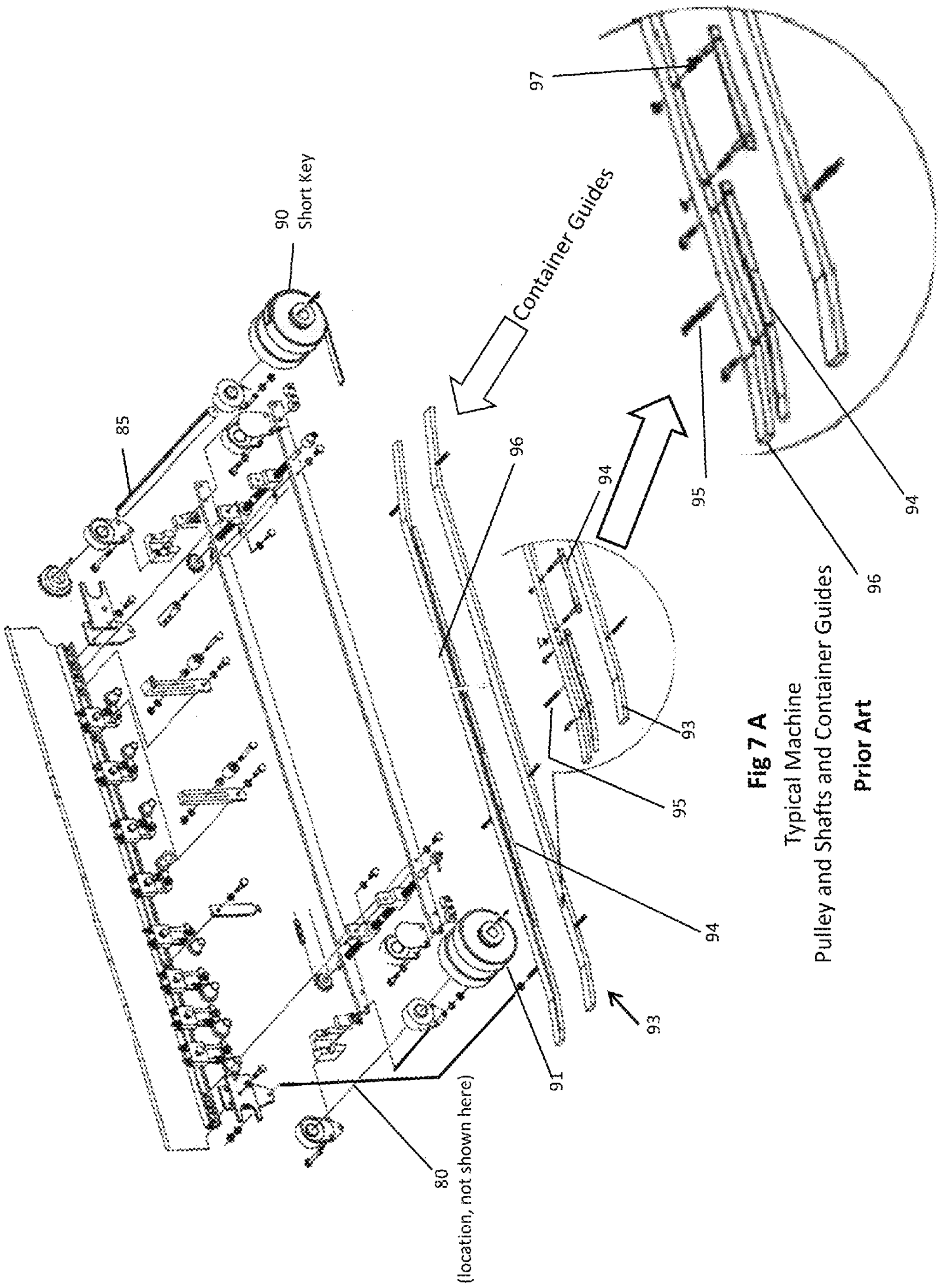
Figure 7B:
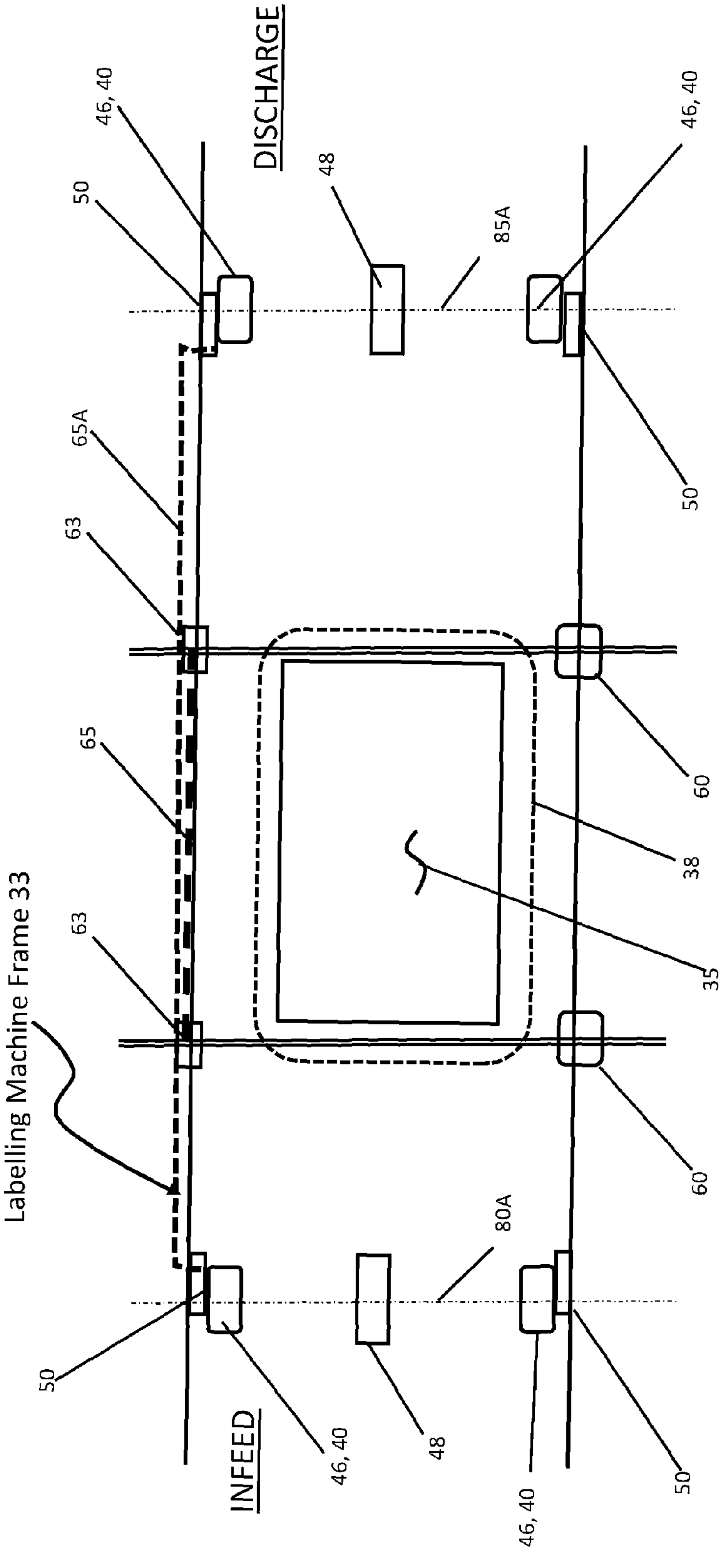

FIG. 7 A is a sketch of a typical label machine components with shafts and pulleys. FIG. 7 B is a sketch with the upgraded and reconfigured components as they would be located on a typical labelling machine.

Figures 8A, 8B, 8C, 8D:
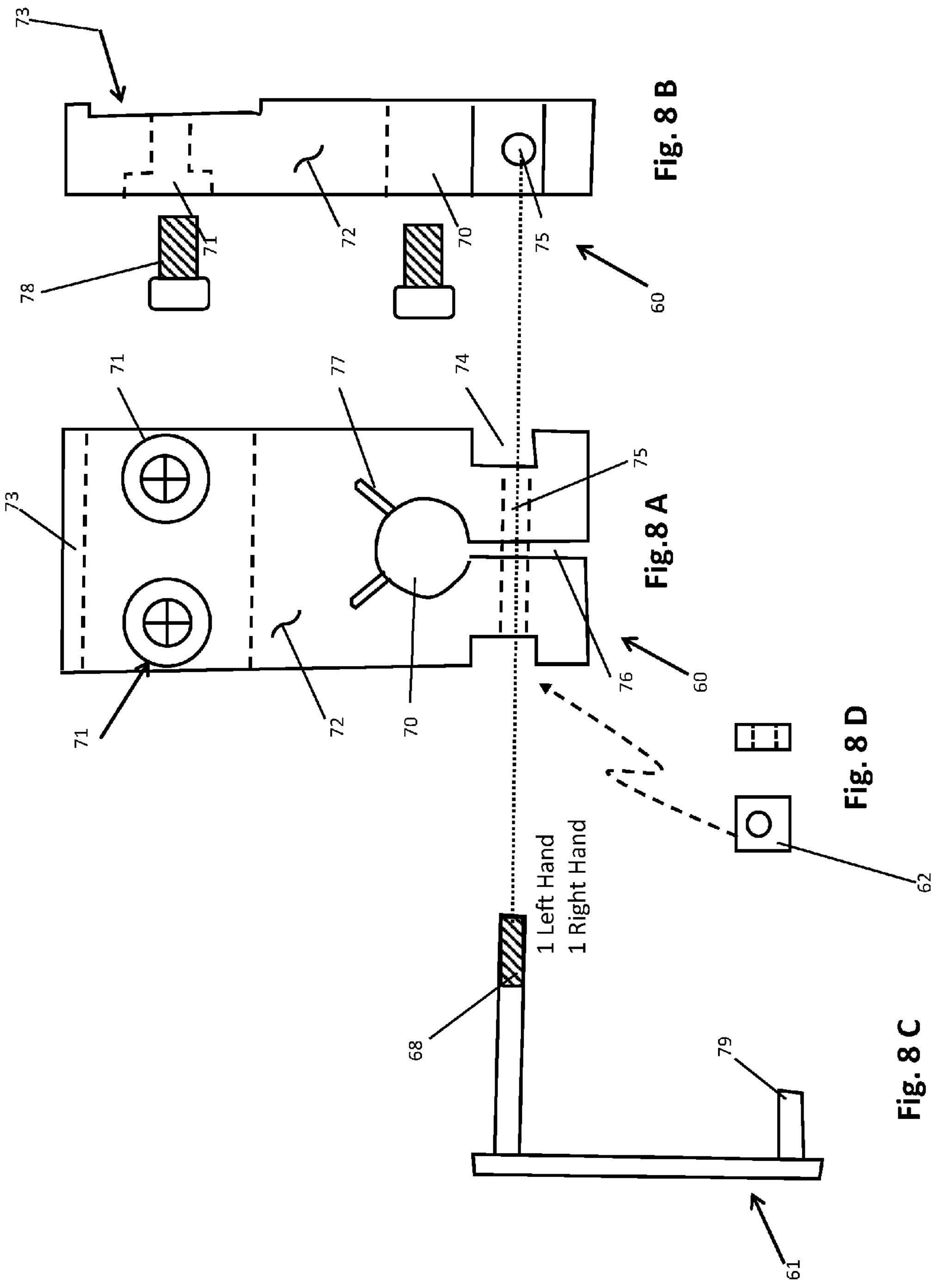

FIGS. 8 A through 8 D are sketches of adjustment knob block 60, lever 61 and their features.

Figures 9A, 9B, 9C, 9D, 9E, 9F, 9G, 9H, 9I:
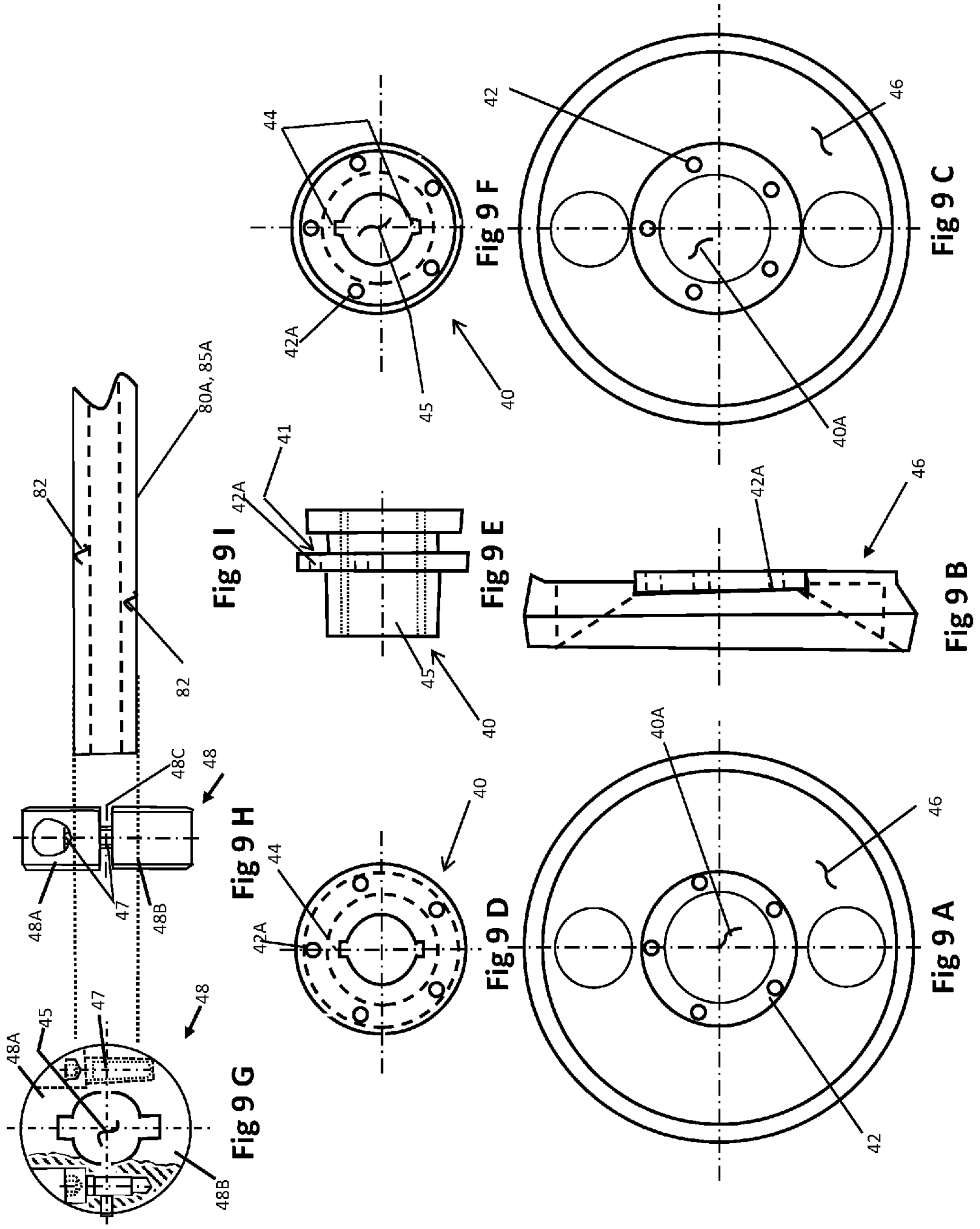

FIGS. 9 A through 9 I are sketches of wheel, wheel hub, and split collar upgrades and how they relate to the machine shafts.

Figures 10A, 10B, 10C, 10D:
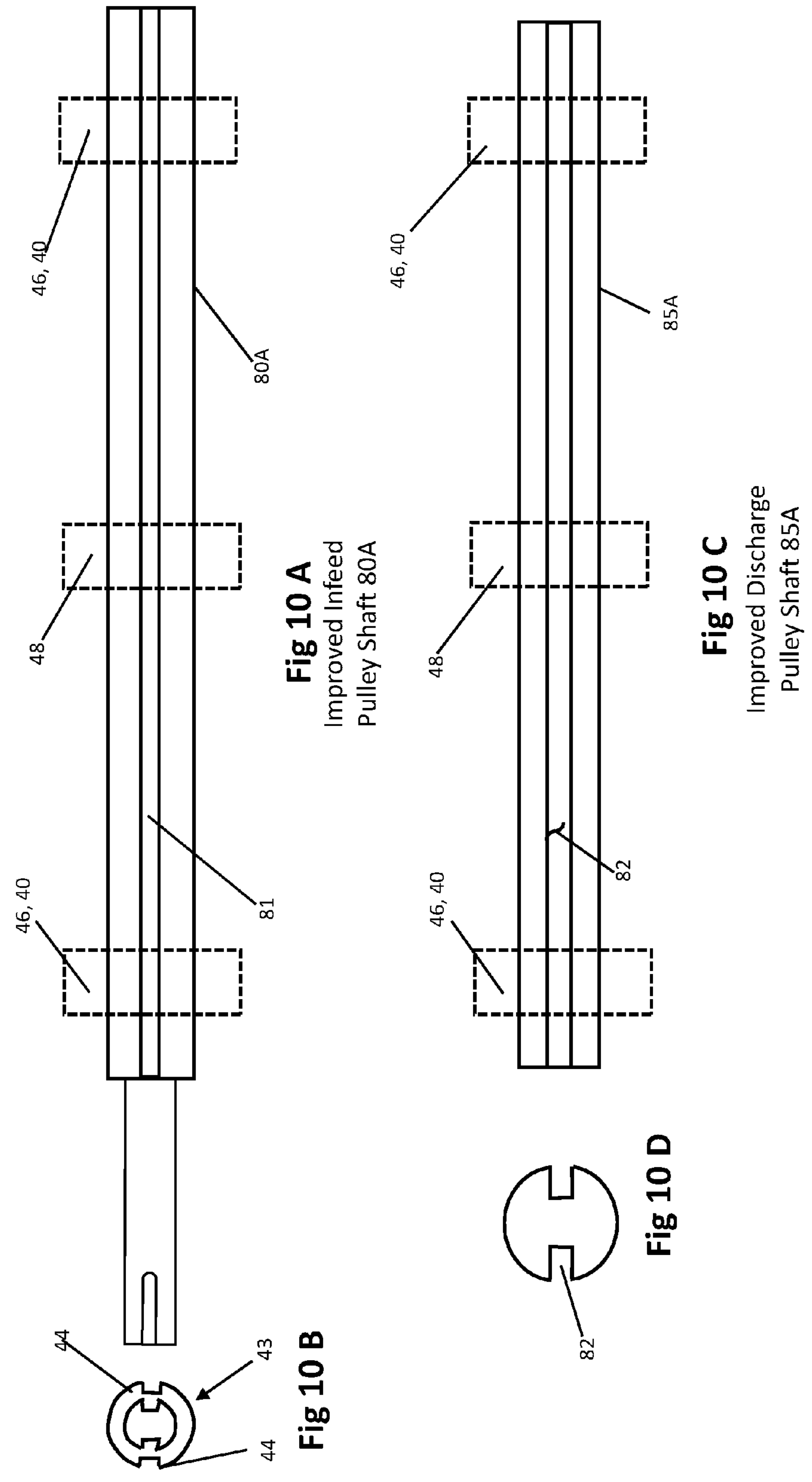

FIGS. 10 A through 10 D are sketches of both the infeed and discharge pulley shaft with the wheel husband split collars shown.

Figure 11A:
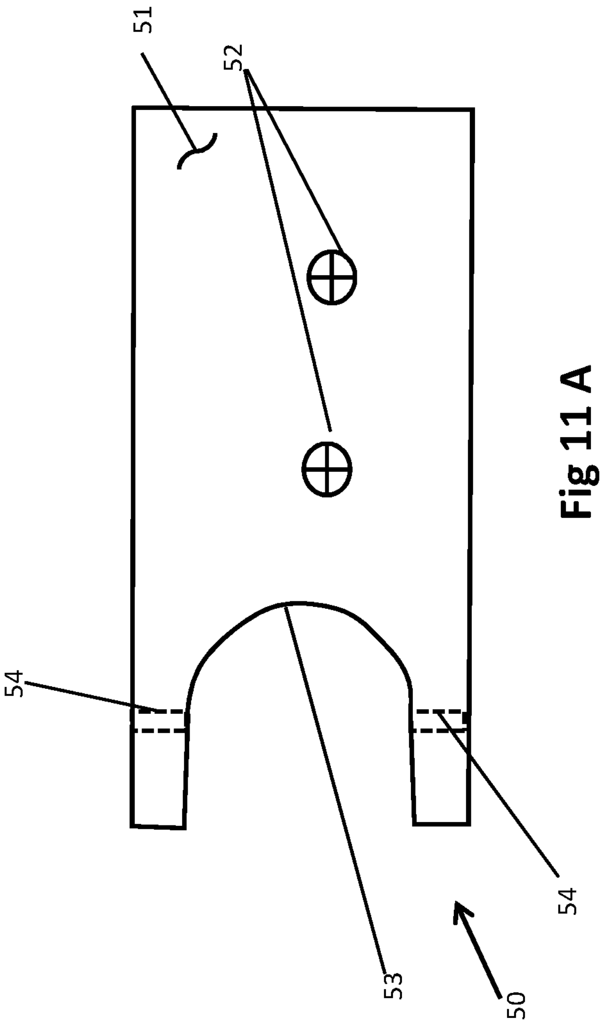
Figure 11B:
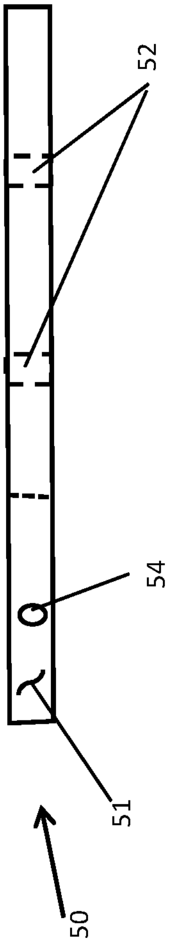
Figure 12B:
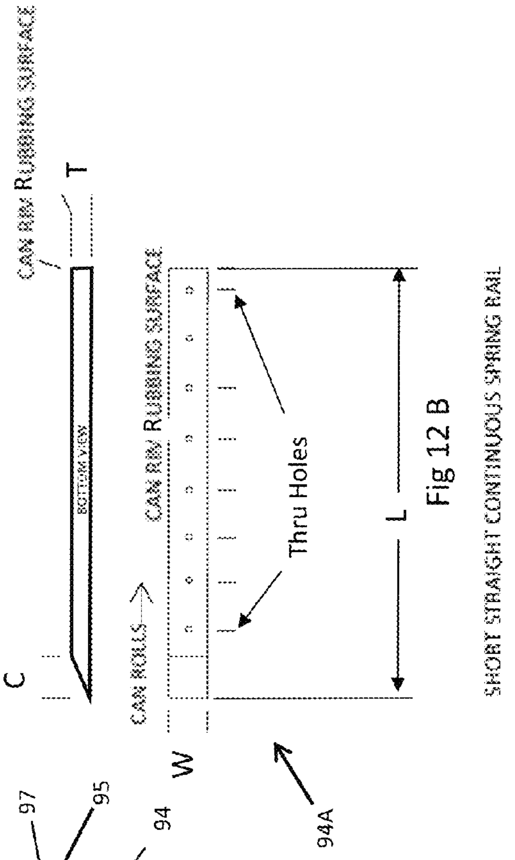
Figure 12A:
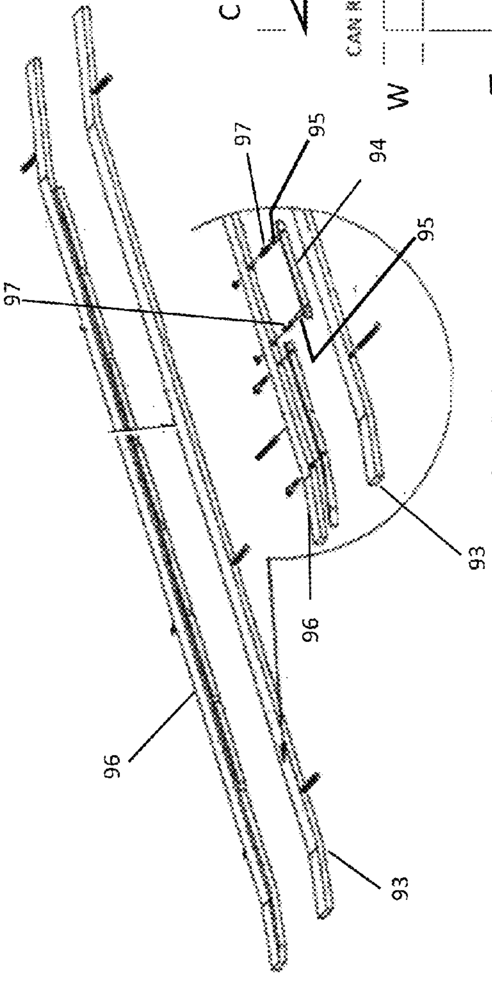
Figure 12D:
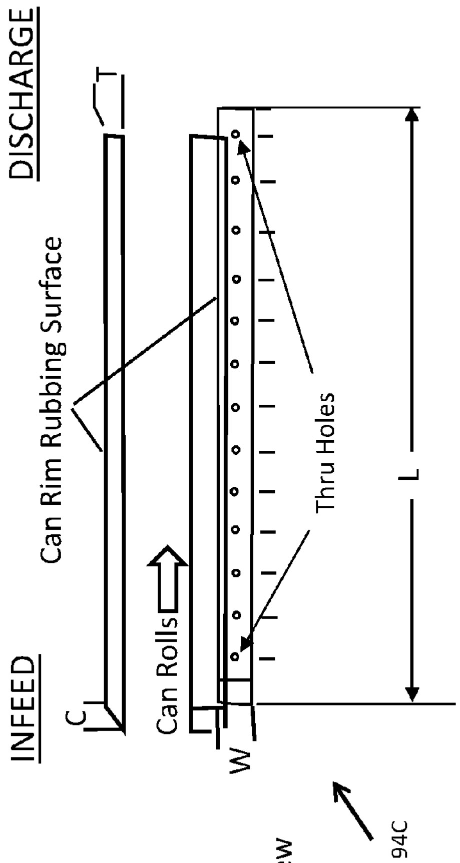
Figure 12C:
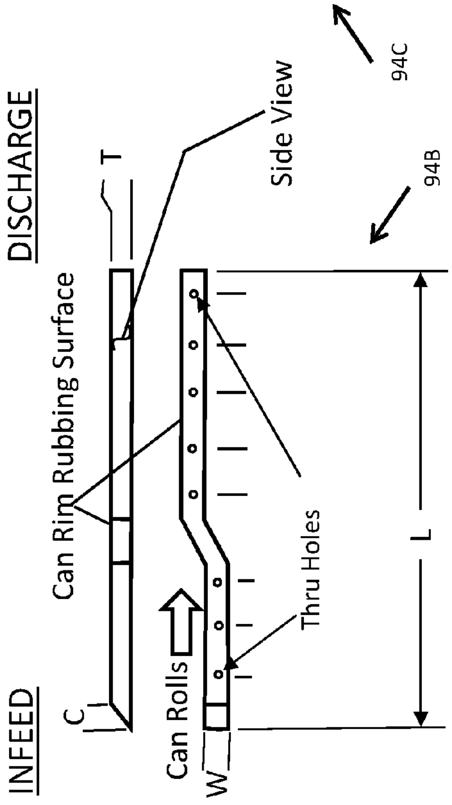

FIGS. 11 A and 11 B are sketches of the labeler wheel guide yoke.

FIG. 12 A is a sketch of the original equipment spring rails. FIGS. 12 B through 12 D are sketches of the improved spring rails.

DESCRIPTION OF THE DRAWINGS—REFERENCE NUMERALS

The following list refers to the drawings Reference numbers:

| Ref # | Description |
|---|---|
| 30 | Typical labeling machine for container (cans, jars, etc.) |
| 31 | Infeed end |
| 32 | Discharge/label end |
| 33 | Label machine frame |
| 35 | Label Bed |
| 38 | Label Box |
| 40 | Wheel hub |
| 40A | Aperture 40A for Wheel hub 40 |
| 41 | Yoke slot/groove to accept yoke 50 on wheel hub 40 |
| 42 | Mounting apertures |
| 42A | Threaded aperture |
| 43 | Step shaft keyway 43 in infeed pulley step shaft 80A |
| 44 | Key way (double) |
| 45 | Shaft aperture |
| 46 | Wheel |
| 47 | Cap lock bolts |
| 48 | Modified two-piece stainless steel lock collar 48 for both the infeed shaft 80A and discharge shaft 85A. Each of these lock collars 48 are needed to hold two essentially $\frac{1}{4} \times \frac{1}{4} \times 12$ inch mild steel keys in place at each shaft 80A, 85A for the essentially $1\frac{1}{4}$ inch wide flat belt infeed pulleys 46 with hubs 40 and discharge pulleys 46 with hubs 40. The split locking collar 48 with double keyways 44 (material is non corrosive 304 stainless steel, composite material or equal) and has threads for removably locking with cap lock bolts 47 |
| 48A | Top split locking collar 48A with bolt shoulder and one keyway 44 |
| 48B | Bottom split locking collar 48B with bolt threads and one keyway 44 |
| 48C | Split Line 48C - contiguous surface of top 48A and bottom 48B split halves of split locking collar 48 |
| 50 | Labeler wheel guide yoke |
| 51 | Yoke plate material (durable) LE Linen based phenolic or equal) |
| 52 | Mounting aperture |
| 53 | Slot/radiused for yoke slot 41 |
| 54 | Grease aperture/fitting mount |
| 60 | Label adjustment 60 normally with a knob and block. Upgraded and reconfigured knob and block assembly with additional parts. |
| 61 | Lever lock (L and R) (4140 pre-hardened steel preferred or 304 stainless steel, composite material or equal) |
| 62 | Square lever nut (4140 pre-hardened steel preferred or 304 stainless steel, composite material or equal) Left and right handed |
| 63 | Slave sprocket connected to adjustment block 60 on some machines |
| 64 | Labeler control box |
| 65 | Chain 65 between slave sprockets 63 to adjust label box on some machines |
| 65A | Slave chain 65A between threaded shafts to adjust upper carriage rails on all machines |
| 66 | Top area of label adjustment |
| 68 | Left/Right-hand threads on lever 61 |
| 70 | Threaded knob shaft opening |
| 71 | Stepped mounting opening |
| 72 | Block of material (durable aluminum or composite) |
| 73 | Machine rail slot |
| 74 | Lever nut recess |
| 75 | Lever nut aperture |
| 76 | Clamp slot |
| 77 | Relief kerfs for clamping |
| 78 | Lever fastening means (threaded, detent or equal) made from materials such as a hardened steel bolt, 304 stainless steel, or equal |
| 79 | Lever short handle 79 at ninety (90) degrees of main lever 61 (4140 pre-hardened steel preferred or 304 stainless steel, composite material or equal). |

-continued

| Ref # | Description |
|---|---|
| 80 | Infeed pulley shaft (OEM) 80 |
| 80A | Improved infeed pulley shaft 80A which is 4140 pre-hardened steel or equal |
| 81 | Key way (¼ in. approximately) |
| 82 | Key way |
| 85 | Discharge pulley shaft (OEM) 85 |
| 85 | Improved discharge pulley shaft 85A which is 4140 pre-hardened steel or equal |
| 90 | OEM discharge pulley |
| 91 | Infeed pulley - OEM |
| 92 | Conveyor belts, essentially 1¼ inch wide, flat belts |
| 93 | Can guide rail 93 - original equipment manufacturer |
| 94 | Spring rails OEM 94 normally 7 pieces approximately 7 inches long or 12 pieces approximately 7 inches long (408 Machine) each with apertures and pins 95 to connect with the guide rails 96. |
| 94 A, B, C | Improved spring rails - essentially one long piece approximately 84 inches or one 49 inches long (408 Machine) with OEM pre-installed inserts 95 - different lengths and configuration - made of pre-hardened materials with inserts chamfered and pinned press fit for quick changeover. |
| 95 | Pins (OEM) that hold spring rails 94, 94A, B, C to guides 96 (punch and expand end of pin expanded at the can rubbing face of the spring rail with coil spring 97 between the guide and spring rails. |
| 96 | Mounting guide (OEM) for mounting the spring rails - both original spring rails 94 and improved spring rails 94A, B, and C. The 408 machine with 7 rails at 7 inches long each. The 704 machine has 12 spring rails each 7 inches long. |
| 97 | Coil spring 97 at pin 95 connecting spring rails 94, 94A, 94B and 94C to mounting guide 96 |
| T | Thickness T of improved spring rails 94A, B, C |
| W | Width W of improved spring rails 94A, B, C |
| C | Chamfer C of improved spring rails 94A, B, C |
| L | Length L of improved spring rails 94A, B, C - essentially one long piece approximately 84 or 49 inches long |

DETAILED DESCRIPTION OF PREFERRED EMBODIMENT

The present development is Reconfigured and Upgraded Component Parts for a Packaging Labeler Machine for container material handling and labeling machines. Particularly this invention pertains to a can labelling machine. This invention relates to improvements in the labelling machine/apparatus for labelling containers automatically and in continuous sequence. In this type of labeling machine the containers or other articles roll through the machine over a substantially horizontal track or bed where they pick up a label by means of an adhesive applied to the cylindrical side of the container after which the label is wrapped about the container and secured to the side of the container or at the opposite end of the label by a suitable adhesive. This invention relates to machines for applying labels to articles of cylindrical form and is designed primarily for placing labels on cans as they are conveyed through the machine over runways.

The advantages for the Reconfigured and Upgraded Component Parts for a Packaging Labeler Machine are listed above in the introduction. Succinctly the benefits are that the upgraded components facilitate:

A. Quick changeover and adjustments—label adjustment knob and lever lock; wheel yoke socket and adjustment; and spring rail;
B. Durable materials—OEM components reconfigured and upgraded for longer life, less maintenance;
C. Interchangeable with OEM designs to minimize maintenance and change over time with current machines; and
D. Lubrication improved wheel yoke.

The preferred embodiment is a series of upgraded and reconfigured components for a container labeling machine made of durable materials and essentially comprising: an adjustment knob block assembly with a lock knob and block components for the label bed; a locking system for key stock on the infeed and discharge shafts; a wheel and wheel hub positioning set of at least four movable yokes for positioning the wheels; and a set of reconfigured guide rails wherein the improvements can provide faster installation and repair as well as longer life with the improved durable materials. The preferred embodiments of the Reconfigured and Upgraded Component Parts for a Packaging Labeler Machine are further described as follows:

A. An adjustment knob block assembly with features comprising: a knob block 60 with a threaded knob shaft opening 70; a stepped mounting opening 71; a block of material 72 (durable aluminum or composite); a machine rail slot 73; a lever nut recess 74; a lever nut aperture 75; a clamp slot 76; and relief kerfs 77 for clamping; a lever lock 61 (L & R—handed, one each) with a lever fastening means 78 (threaded bolt and aperture or equal and made from materials such as a hardened steel bolt or equal) and configured with a lever handle 79; and a lever nut—left and right hand—(one each) 62 (note the lever, lever handle, nut and threads are preferred 4140 pre hard steel and could also be 304 stainless steel, composite material or equal) wherein the knob block can be coupled with a knob and provide fast adjustment and locking means to a label box 38 and label bed 35.
B. A wheel 46, a wheel hub 40, and wheel guide yoke 50 including: the wheel 46 with aperture 40A for wheel hub 40 and threaded aperture 42A for fasteners; the wheel hub 40 with yoke slot 41; mounting apertures 42; key way 44 (double); and shaft aperture 45; and the labeler wheel guide yoke 50 comprised of the labeler wheel guide yoke 50 (a plate material 51 LE Linen based phenolic or equal); a mounting aperture 52; a slot 53/radiused for yoke slot 41; and multiple grease aperture 54 fitting mounts.
C. A series of improved container spring rails (94 A, B, C) of different extended lengths and configuration and made of pre-hardened materials chamfered and pinned with OEM pins 95.

There is shown in FIGS. 1-12 a complete description and operative embodiment of the Reconfigured and Upgraded Component Parts for a Packaging Labeler Machine devices. In the drawings and illustrations, one notes well that the FIGS. 1-12 demonstrate the general configuration and use of this product. All components herein exposed to continuous wear from moving containers anticipate being comprised of durable materials such as 4140 pre-hardened steel, 304 stainless steel, and/or composite material.

The accompanying drawings, which are incorporated in and constitute a part of this specification, illustrate an embodiment of the Reconfigured and Upgraded Component Parts for a Packaging Labeler Machine. The drawings together with the summary description given above and a detailed description given below serve to explain the principles of the Reconfigured and Upgraded Component Parts for a Packaging Labeler Machine. It is understood, however, that the Reconfigured and Upgraded Component Parts for a Packaging Labeler Machine are not limited to only the precise arrangements and instrumentalities shown. Other examples of Reconfigured and Upgraded Component Parts for a Packaging Labeler Machine and uses are still understood by one skilled in the art of material handling and labelling machines for containers such as cans and jars etc. to be within the scope and spirit shown here.

Figures 1A, 1B, 1C, 1D, 1E, 1F, 1G, 1H, 1I, 1J:
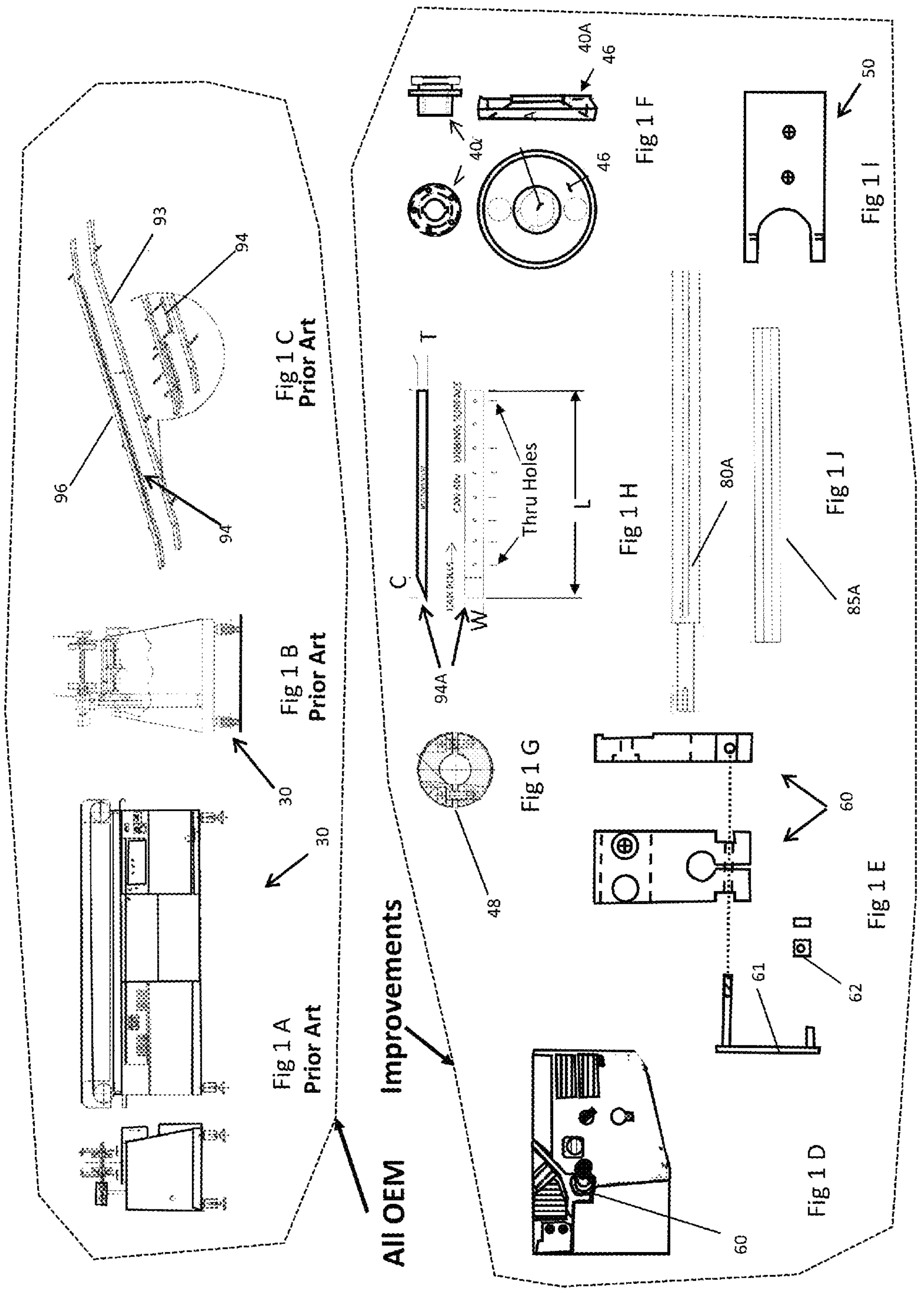
Fig 1 A Prior Art
Fig 1 B Prior Art
Fig 1 C Prior Art

FIGS. 1 A through 1 C are sketches of the general OEM labeling machine. FIGS. 1 D through 1 J are upgraded and reconfigured components for the container labelling machine. Shown in FIGS. 1 A through 1 C are a typical labeling machine 30 for container (cans, jars, etc.); mounting and spring rails 94 with OEM pre-installed inserts comprised of a set of mounting rails 96 for holding spring rail 94 of short lengths (approximately 12 inches) and made of pre-hardened materials with OEM pre-installed inserts chamfered and pinned by pins 95 which are press fit and end expanded for quick changeover. Opposite these are the can guide 93. FIGS. 1 D through 1 J are upgraded and reconfigured components—a knob block assembly 60, a split locking collar 48, improved wheels 46 and hubs 40, improved yokes 50 and an OEM mounting rails 96 for holding spring rail 94 A, B, C of different lengths and configuration and made of pre-hardened materials chamfered and pinned by OEM pins 95 which are press fit and end expanded for quick repair. Opposite these are the can guide 93. Also shown are the infeed step shaft 80A and discharge shaft 85A.

Figure 2:
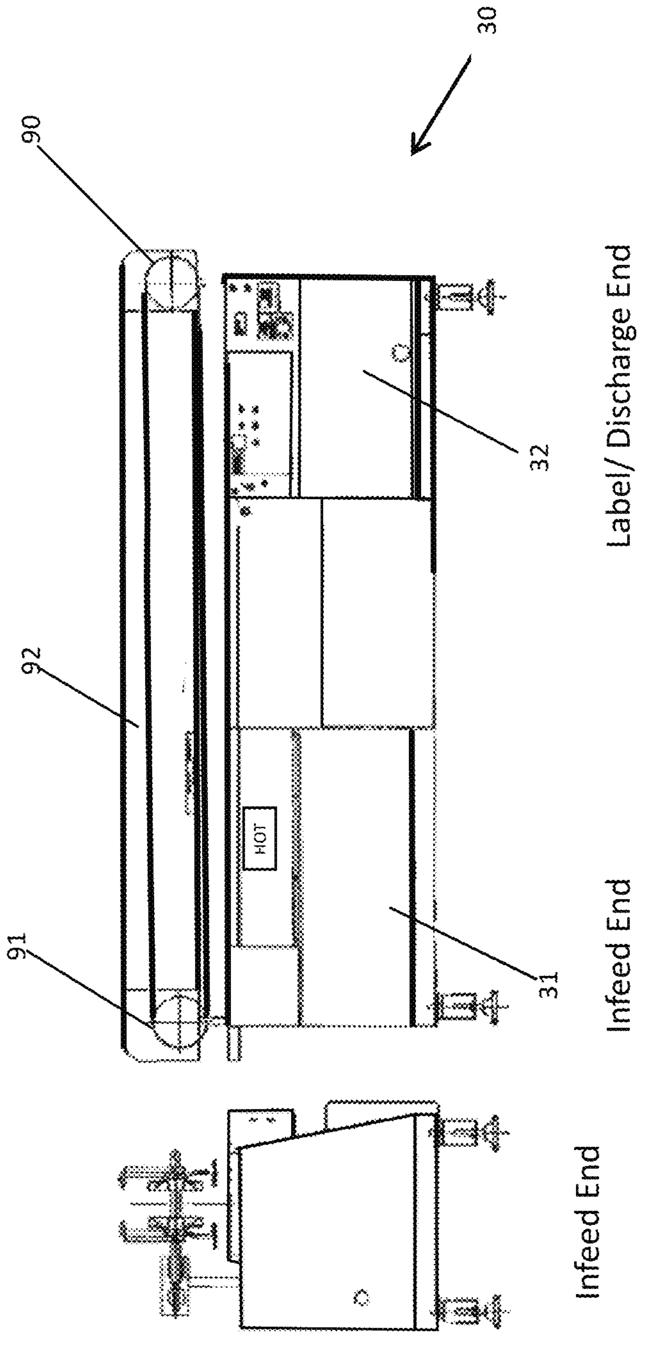
FIG. 2 is a sketch of the general typical container labeling machine device with components.

FIG. 2 is a sketch of the general typical container labeling machine with components. This shows a typical labeling machine 30 for container (cans, jars, etc.); infeed end 31; discharge/label end 32; discharge pulley 90; infeed pulley 91; conveyor belts, essentially 1¼ inch wide, flat belts 92. One notes that the machines shown in FIGS. 2 through 5 are the typical, unimproved state of a label machines, such as Burt or others, which these improved component parts portrayed herein can be used on. The typical Burt machines are the "Model 408 and 704 roll through labeler right hand and left hand" machine. Importantly, one acknowledges that the parts only fit the 408 and 704 machines which are equipped with the 1¼" wide flat belts, not those equipped with v-belts. As one skilled in label machines understands, the scope and intent of these improved parts and components may well be used on other container processing and labelling machine. The Burt scenario is only one example.

Figure 3:
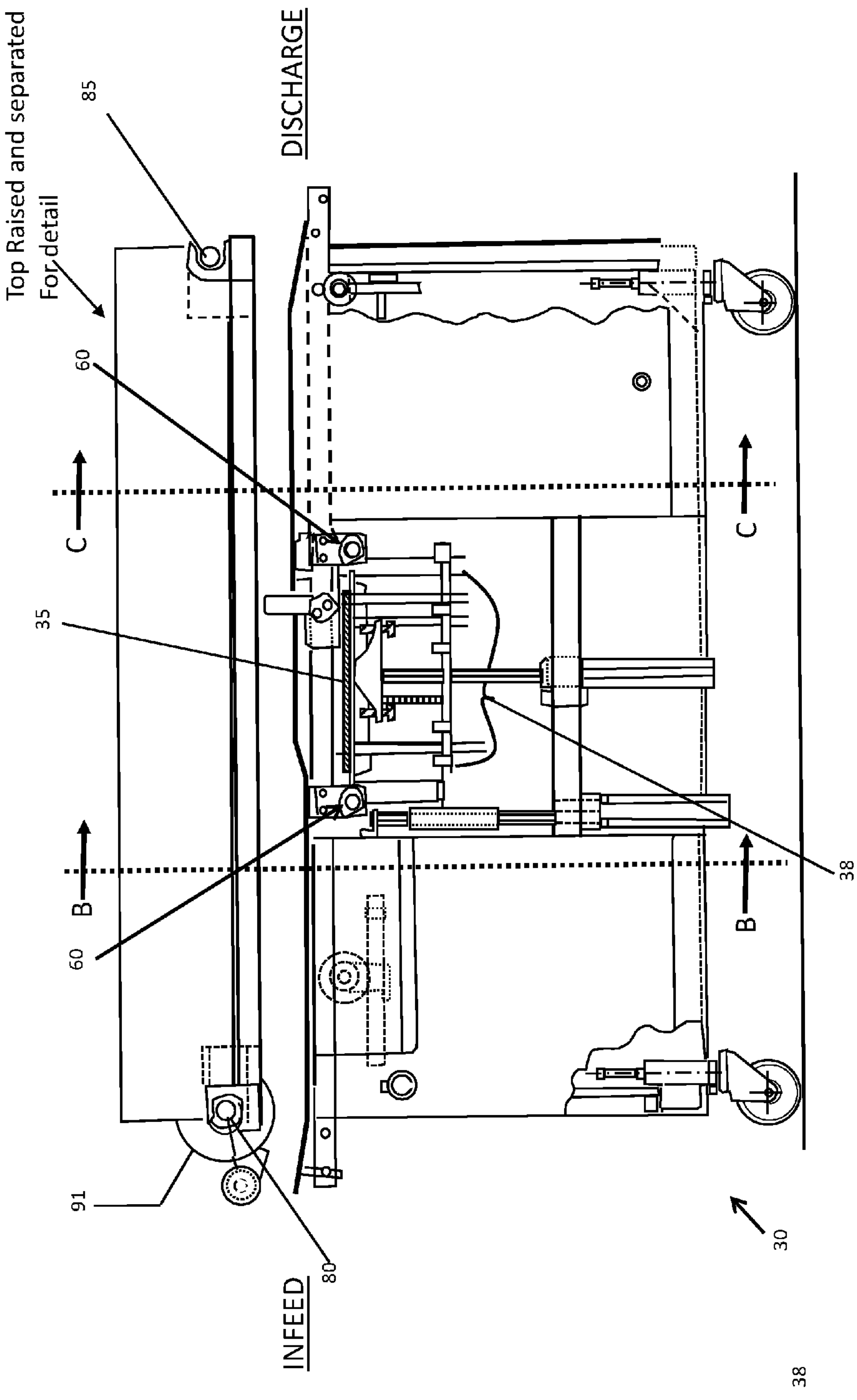
FIG. 3 is a sketch of the label machine 30 with the label adjustments components and features shown from generally a side view.

FIG. 3 is a sketch of the label machine with the label adjustments components and features shown from generally a side view. In this drawing is shown components of a typical labeling machine 30 for container (cans, jars, etc.); a label adjustment knob and block assembly 60; the OEM infeed pulley shaft 80; the discharge pulley shaft 85; and an infeed pulley 91. The pulleys have a keyway and the shafts use a relatively short key only at the OEM pulley. Opposite the adjustment knob assembly 60 is a slave sprocket 63 (not shown).

FIGS. 4 A and 4 B are sketches of a general side and top view of label machine 30 where improved adjustment knob/block is not installed. Demonstrated here are the typical labeling machine 30 for container (cans, jars, etc.); a label adjustment 60 normally with a knob and block; and a labeler control box 64.

FIGS. 5 A through 5 D are sketches of labeler machine 30 from various angles to show a machine which benefits from the improved components. Once again is shown the labeling machine 30; an infeed end 31; a discharge/label end 32; and a label adjustment knob and block 60.

FIGS. 6 A through 6 D are cross section sketches of end views and cross sections of the OEM label machine. The labeling machine 30 for container (cans, jars, etc.); infeed pulley shaft 80; and discharge pulley shaft 85 are shown as well as the adjustment knob 60 and slave sprocket 63.

FIG. 7 A is a sketch of the typical label machine components with shafts and pulleys. Presented here are the discharge pulley 90; infeed pulley 91; A series of container mounting and spring rails with OEM pre-installed inserts comprised of a set of mounting rails 96 (for holding spring rail 94 and pinned by OEM pins 95 which are press fit. The enlargement of the drawing shows a section of the stack-up of short spring rail 94, the pin 95 and coil spring 97 attached to the mounting rail 96. FIG. 7 B is the sketch with the improved components shown on one type of OEM design of labelling machine 30. The adjustment knobs 60 shafts are directly connected though a shaft to the slave sprockets 63. The slave sprockets are connected by the chain 65 so that as adjustments are made, each sprocket can move accordingly. This adjusts around the label box and bed 35. Also, the adjustable yokes 50 (at radius 53) are in the groove 41 of the wheel hub 40 and wheel hub 40 is mounted to the wheel 46. The wheels 46 and hub 40 are fastened to each other and are slidably connected to the infeed 80A and discharge 85A shafts through the key and keyway 44. The keys on each shaft are held by the split locking collars 48. Therefore when the yokes 50 are adjusted, the wheels 46 can move axially on the fully keyed shafts 80A, 85A. The wheels 46 replace the OEM Pulleys 90. This replacement wheel 46 has keys and keyways that are short (only the width of the pulley 90). Thus the upgraded, shorter components permit fast adjustments of the wheels that carry the essentially 1¼ inch flat belts. One notes also the slave chain 65A between threaded shafts to adjust upper carriage rails on all machines. All mounted components are mounted to the frame 33 of the label machine 30.

FIGS. 8 A through 8 D are sketches of adjustment knob block 60, lever 61 and features. In these views are the label adjustment knob and block 60; lever lock 61 (L & R—handed and 4140 pre-hardened steel preferred or 304 stainless steel, composite material or equal); square lever nut 62 (note the lever, lever handle nut and threads are preferred 4140 pre hard steel and could also be 304 stainless steel, composite material or equal); a threaded knob shaft opening 70; the stepped mounting opening 71; the block of material 72 (durable aluminum or composite); a machine rail slot 73; lever nut recess 74; lever nut aperture 75; clamp slot 76; relief kerfs 77 for clamping; a lever fastening means 78 (threaded, clips, cotter pins, detent or equal) (one each of both a left and right threads made from materials such as a hardened steel bolt or equal; and lever short handle 79 at ninety (90) degrees of main lever 78.

FIGS. 9 A through 9 F are sketches of wheel 46 and wheel hub 40 improvements. Shown are components and features as the wheel hub 40; aperture 40A for wheel hub 40; yoke slot 41; mounting apertures 42; threaded aperture 42A; key way 44 (double); shaft aperture 45; and wheel 46. The two set screw holes on each of the four wheels have been removed from the design. The set screws have been replaced with one lock collar on the infeed shaft and one lock collar on the discharge shaft. Both lock collars are placed between the two wheels on each shaft, directly in the middle of them. They are on the two shafts and holding two essentially 12" pieces of key stock, one on each side of the two shafts. Both lock collars are a two (2) piece stainless steel with one key way cut into each piece. Two key ways per lock collar are cut into them. FIGS. 9 G through 9 I show an alternative split locking collar with double keyways and threads. Displayed is a modified two-piece stainless steel lock collar 48 for both the infeed shaft 80A and discharge shaft 85A. Each of these lock collars 48 are needed to hold two essentially ¼×¼×12 inch mild steel keys in place at each shaft 80A, 85A for the essentially 1¼ inch wide flat belt infeed pulleys 91 and discharge pulleys 90. A split locking collar 48 with double keyways 44 (preferred material is non-corrosive 304 stainless steel, composite material or equal) and with threads for removably locking with cap lock bolts 47. Shown here also are the cap lock bolts 47, split locking collar 48 with double keyways 44 (material is 4140 pre-hardened steel preferred or 304 stainless steel, composite material or equal) and with threads for removably locking with cap lock bolts 47, top split locking collar 48A with bolt shoulder and one keyway 44, and the bottom split locking collar 48A with bolt threads and one keyway 44. The threads hold two socket cap screws (bolts). This permits the locking collar to be mounted or replaced without removing the shafts 80A, 85A. It also permits adjustments to the wheel 46 and wheel hub 40, or alternatively replacing a wheel 46 and wheel hub 40 that has a split configuration without full shaft removal. This alternative split locking collar 48 allows for much faster adjustment and/or replacement of machine components. The double keyway 44 is an unobvious improvement to the interconnection with the shafts 80A, 85A over a common single keyway. One notes in FIG. 9 H the split line 48C—a contiguous surface of top 48A and bottom 48B split halves of split locking collar 48.

FIGS. 10 A through 10 D are sketches of infeed 80A and discharge pulley 85A shafts with features. Shown here are an infeed pulley shaft 80A with dual key way 81 (¼ in. square approximately) and a discharge pulley shaft 85A with key ways 82. One also notes in FIG. 10 B a step shaft keyway 43 at one end of infeed pulley shaft 80A FIGS. 11 A and 11 B are sketches of labeler wheel guide yoke 50. Features of the labeler wheel guide yoke 50 are a plate material 51 (durable, LE Linen based phenolic or equal); a mounting aperture 52; a slot 53 radiused for yoke slot 41; and multiple grease aperture 54 fitting mounts.

FIG. 12 A is a sketch of original equipment spring rails 94. There are typically seven or twelve short spring rails (approximately 7 inches long, more or less, and configured straight). FIGS. 12 B through 12 D are sketches of the improved spring rails. Portrayed here are a series of upgraded and reconfigured spring rails 94 A, B, C which mount on OEM mounting rails 96 for holding improved spring rails (94A, B, C) of different lengths and configuration, or OEM spring rails. The improved spring rails are made of pre-hardened materials and pinned by OEM pins 95 which are press fit. Opposite the spring rails 94 A, B and C is the can guide 93. Spring rails 94A, B, C are different lengths and configuration—made of pre-hardened materials. One notes that the spring rails do not have press in pins made by this inventor. They are OEM. The OEM and inventor's spring rails use common springs and common cotter pins. The springs and cotter pins are OEM. One also may note the thickness T of spring rails 94A, B, C; width W of spring rails 94A,B,C; chamfer C of spring rails 94A,B,C; and length L of spring rails 94A,B,C. The lengths can be rather elongated up to approximately 84 inches for fast replacement. This alleviates the separation points found with the OEM short (approximately 7 inches long). Each separation in between the OEM spring rails provides a potential jam point for the rolling cans and containers, and causes more pin breakage.

The details mentioned here are exemplary and not limiting. Other specific components and matters specific to describing upgraded and reconfigured parts for a packaging labeling machine may be added as a person having ordinary skill in the field of material handling and labelling machines (for containers such as cans, jars etc.) and their uses well appreciates.

OPERATION OF THE PREFERRED EMBODIMENT

The Reconfigured and Upgraded Component Parts for a Packaging Labeler Machine have been described in the above embodiment. The manner of how the device operates is described below. One notes well that the description above and the operation described here must be taken together to fully illustrate the concept of the Reconfigured and Upgraded Component Parts for a Packaging Labeler Machine.

The Reconfigured and Upgraded Component Parts for a Packaging Labeler Machine operates somewhat similar to other machine components yet with higher durability for maintenance and easy quick changeover (some tool-less) for less downtime at repair and product changeover.

Many uses are anticipated for the Reconfigured and Upgraded Component Parts for a Packaging Labeler Machine such as with a Burt machine or others. Some examples, and not limitations, are shown in the following Table.

| ITEM | DESCRIPTION |
|---|---|
| 1 | Model 408 roll through labeler - right hand and left hand |
| 2 | Model 704 roll through labeler right hand |
| 3 | Model 704 roll through labeler left hand |

As one skilled in label machines understands, the scope and intent of these improved parts and components may well be used on other container processing and labelling machine. The Burt machine scenario is only one use.

With this description it is to be understood that the Reconfigured and Upgraded Component Parts for a Packaging Labeler Machine are not to be limited to only the disclosed embodiment of product. The features of the special Reconfigured and Upgraded Component Parts for a Packaging Labeler Machine are intended to cover various modifications and equivalent arrangements included within the spirit and scope of the description.

Unless defined otherwise, all technical and scientific terms used herein have the same meaning as commonly understood by one of ordinary skills in the art to which these inventions belong. Although any methods and materials similar or equivalent to those described herein can also be used in the practice or testing of the present inventions, the preferred methods and materials are now described. All patents and publications mentioned herein, including those cited in the background of the application, are hereby incorporated by reference to disclose and describe the methods and/or materials in connection with which the publications are cited.

The publications discussed herein are provided solely for their disclosure prior to the filing date of the present application. Nothing herein is to be construed as an admission that the present inventions are not entitled to antedate such publication by virtue of prior invention. Further, the dates of publication provided may be different from the actual publication dates which may need to be independently confirmed.

Other embodiments of the invention are possible. Although the description above contains much specificity, these should not be construed as limiting the scope of the invention, but as merely providing illustrations of some of the presently preferred embodiments of this invention. It is also contemplated that various combinations or sub-combinations of the specific features and aspects of the embodiments can be made and still fall within the scope of the inventions. It should be understood that various features and aspects of the disclosed embodiments can be combined with or substituted for one another in order to form varying modes of the disclosed inventions. Thus, it is intended that the scope of at least some of the present inventions herein disclosed should not be limited by the particular disclosed embodiments described above.

Thus the scope of this invention should be determined by the appended claims and their legal equivalents. Therefore, it will be appreciated that the scope of the present invention fully encompasses other embodiments which may become obvious to those skilled in the art and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention for it to be encompassed by the present claims. Furthermore, no element, component, or method step in the present disclosure is intended to be dedicated to the public regardless of whether the element, component, or method step is explicitly recited in the claims.

The terms recited in the claims should be given their ordinary and customary meaning as determined by reference to relevant entries (e.g., definition of "plane" as a carpenter's tool would not be relevant to the use of the term "plane" when used to refer to an airplane, etc.) in dictionaries (e.g., widely used general reference dictionaries and/or relevant technical dictionaries), commonly understood meanings by those in the art, etc., with the understanding that the broadest meaning imparted by any one or combination of these sources should be given to the claim terms (e.g., two or more relevant dictionary entries should be combined to provide the broadest meaning of the combination of entries, etc.) subject only to the following exceptions: (a) if a term is used herein in a manner more expansive than its ordinary and customary meaning, the term should be given its ordinary and customary meaning plus the additional expansive meaning, or (b) if a term has been explicitly defined to have a different meaning by reciting the term followed by the phrase "as used herein shall mean" or similar language (e.g., "herein this term means," "as defined herein," "for the purposes of this disclosure [the term] shall mean," etc.). References to specific examples, use of "i.e.," use of the word "invention," etc., are not meant to invoke exception (b) or otherwise restrict the scope of the recited claim terms. Other than situations where exception (b) applies, nothing contained herein should be considered a disclaimer or disavowal of claim scope. Accordingly, the subject matter recited in the claims is not coextensive with and should not be interpreted to be coextensive with any particular embodiment, feature, or combination of features shown herein. This is true even if only a single embodiment of the particular feature or combination of features is illustrated and described herein. Thus, the appended claims should be read to be given their broadest interpretation in view of the prior art and the ordinary meaning of the claim terms.

As used herein, spatial or directional terms, such as "left," "right," "front," "back," and the like, relate to the subject matter as it is shown in the drawing FIGS. However, it is to be understood that the subject matter described herein may assume various alternative orientations and, accordingly, such terms are not to be considered as limiting. Furthermore, as used herein (i.e., in the claims and the specification), articles such as "the," "a," and "an" can connote the singular or plural. Also, as used herein, the word "or" when used without a preceding "either" (or other similar language indicating that "or" is unequivocally meant to be exclusive—e.g., only one of x or y, etc.) shall be interpreted to be inclusive (e.g., "x or y" means one or both x or y). Likewise, as used herein, the term "and/or" shall also be interpreted to be inclusive (e.g., "x and/or y" means one or both x or y). In situations where "and/or" or "or" are used as a conjunction for a group of three or more items, the group should be interpreted to include one item alone, all of the items together, or any combination or number of the items. Moreover, terms used in the specification and claims such as have, having, include, and including should be construed to be synonymous with the terms comprise and comprising.

Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques.

What is claimed as new and desired to be protected by Letters Patent is:

1. A group of upgraded and reconfigured components for a container labeling machine made of durable materials and comprising:

a. at least one adjustment knob block assembly, for making a label box adjustment, the knob block assembly comprising a locking lever;

b. a locking system for a centrally mounted key stock on each of an infeed shaft and a discharge shaft;

c. at least two wheels and wheel hubs disposed on each of the infeed shaft and the discharge shaft creating a wheel and wheel hub positioning set;

d. the wheel and wheel hub positioning set further comprising at least four movable yokes for positioning the wheels; and e. a set of elongated guide rails with quick-change, press-fit fasteners wherein said upgraded and reconfigured components are components involved in a changeover from one container size to another and provide faster installation and replacement.

2. The adjustment knob block assembly (60) according to claim 1 further comprising: a knob and a block with a threaded knob shaft opening (70);

a stepped mounting opening (71);

a block of material (72);

a machine rail slot (73);

a lever nut recess (74);

a lever nut aperture (75);

a clamp slot (76) and relief kerfs (77) for clamping;

said locking lever (61) further comprising a lever fastening means (78); a lever handle (79); and a lever nut (62)

wherein the knob block assembly with locking lever (61) can be coupled with a knob and provide fast adjustment and locking means for a labelling machine label box.

3. The wheel and wheel hub positioning set according to claim 1:

each of the at least two wheels (46) having an aperture (40A) for each of the wheel hubs (40) and threaded aperture (42A) for fasteners;

each of the at least two wheel hubs (40) having a yoke slot (41), mounting aperture (42), double key way (44), and shaft aperture (45);

and a position set labeler wheel guide yoke (50) having a mounting aperture (52); a slot (53) radiused for yoke slot (41); and multiple grease aperture (54) fitting mounts; said wheel guide yoke manufactured from LE linen based phenolic.

4. The locking system for a centrally mounted key stock on each of an infeed shaft and a discharge shaft according to claim 1 further comprising: a two-piece split locking collar (48) with double keyways (44), wherein each of these lock collars (48) hold two essentially ¼×¼×12 inch mild steel keys in place on each of the infeed and discharge shaft (80A, 85A).

5. The set of guide rails according to claim 1 further comprising a series of container spring rails (94 A, B, C) of different lengths and configuration and made of pre-hardened materials chamfered and pinned, the spring rails placed opposite a can guide (93).

* * * * *